US012697833B2

(12) United States Patent
Holmes et al.

(10) Patent No.: US 12,697,833 B2
(45) Date of Patent: Aug. 4, 2026

(54) OPTICAL DEVICES AND METHODS OF MANUFACTURE THEREOF

(71) Applicant: DE LA RUE INTERNATIONAL LIMITED, Basingstoke (GB)

(72) Inventors: Brian Holmes, Basingstoke (GB); Frederic Fournier, Basingstoke (GB); Maria King, Basingstoke (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 448 days.

(21) Appl. No.: 18/035,311

(22) PCT Filed: Nov. 4, 2021

(86) PCT No.: PCT/GB2021/052868
§ 371 (c)(1),
(2) Date: May 4, 2023

(87) PCT Pub. No.: WO2022/096892
PCT Pub. Date: May 12, 2022

(65) Prior Publication Data
US 2023/0406026 A1 Dec. 21, 2023

(30) Foreign Application Priority Data
Nov. 6, 2020 (GB) .................................... 2017586

(51) Int. Cl.
*G02B 5/18* (2006.01)
*B42D 25/324* (2014.01)
(Continued)

(52) U.S. Cl.
CPC ......... *B42D 25/328* (2014.10); *B42D 25/324* (2014.10); *G02B 5/1819* (2013.01);
(Continued)

(58) Field of Classification Search
CPC ........ G02B 5/18; G02B 27/44; G02B 5/1819; G02B 5/1847; B42D 25/328
(Continued)

(56) References Cited

U.S. PATENT DOCUMENTS 5,784,200 A * 7/1998 Modegi .................... G03H 1/30
359/569
2003/0155495 A1* 8/2003 Drinkwater .......... G03H 1/0011
250/237 R
(Continued)

FOREIGN PATENT DOCUMENTS

EP 0 059 056 A1 9/1982
EP 0723501 A1 7/1996
(Continued)

OTHER PUBLICATIONS

May 3, 2022 International Search Report issued in International Patent Application No. PCT/GB2021/052868.
(Continued)

*Primary Examiner* — Audrey Y Chang
(74) *Attorney, Agent, or Firm* — Oliff PLC

(57) ABSTRACT
An optical device includes: first grating regions each having a plurality of first grating elements each having a principal component of orientation substantially orthogonal to a first direction; and second grating regions each including a plurality of second grating elements each having a principal component of orientation substantially orthogonal to a second direction. At least a subset of the first grating regions each exhibit a diffractive colour such that a user viewing at a first viewing angle perceives a first diffractive colour image. At least a subset of the second grating regions are achromatic, each including a plurality of grating sub-regions having different respective grating element pitches and arranged such that, for a plurality of second viewing angles, the diffractive colours exhibited by the sub-regions cooper-
(Continued)

ate such that the achromatic grating region is perceived to exhibit diffractive whiteness. The sets of first and second grating regions are interlaced.

19 Claims, 10 Drawing Sheets

(51) Int. Cl.

| | |
|---|---|
| *B42D 25/328* | (2014.01) |
| *B42D 25/351* | (2014.01) |
| *B42D 25/355* | (2014.01) |
| *B42D 25/373* | (2014.01) |
| *B42D 25/41* | (2014.01) |

(52) U.S. Cl.
CPC .......... *G02B 5/1847* (2013.01); *B42D 25/351* (2014.10); *B42D 25/355* (2014.10); *B42D 25/373* (2014.10); *B42D 25/41* (2014.10)

(58) Field of Classification Search
USPC ...................................... 359/2, 569, 567, 573
See application file for complete search history.

(56) References Cited

U.S. PATENT DOCUMENTS

| | | | | |
|---|---|---|---|---|
| 2004/0032659 A1* | 2/2004 | Drinkwater | .......... | G03H 1/0244 |
| | | | | 359/558 |
| 2007/0183045 A1 | 8/2007 | Schilling et al. | | |
| 2012/0236415 A1* | 9/2012 | Nagano | .................. | G02B 30/40 |
| | | | | 359/567 |
| 2018/0194156 A1 | 7/2018 | Kubo et al. | | |
| 2022/0402292 A1* | 12/2022 | Holmes | .................. | B42D 25/29 |

FOREIGN PATENT DOCUMENTS

| | | | |
|---|---|---|---|
| EP | 0724519 | A1 | 8/1996 |
| EP | 0 860 298 | A2 | 8/1998 |
| EP | 1 141 480 | A1 | 10/2001 |
| EP | 1 398 174 | A1 | 3/2004 |
| EP | 2 676 802 | A1 | 12/2013 |
| GB | 2563905 | A | 1/2019 |
| GB | 2588183 | A | 4/2021 |
| WO | 83/00659 | A1 | 3/1983 |
| WO | 00/39391 | A1 | 7/2000 |
| WO | 03/054297 | A2 | 7/2003 |
| WO | 03/095188 | A2 | 11/2003 |
| WO | 2018/204982 | A1 | 11/2018 |

OTHER PUBLICATIONS

May 3, 2022 Written Opinion issued in International Patent Application No. PCT/GB2021/052868.
Apr. 28, 2021 Search Report issued in British Patent Application No. 2017586.5.

* cited by examiner

Fig. 6

OPTICAL DEVICES AND METHODS OF MANUFACTURE THEREOF

FIELD OF THE INVENTION

The present invention is directed to optical devices and their method of manufacture. The invention is particularly applicable to the field of security devices, where such optical devices may be used as means of determining the authenticity of a security document such as a banknote or passport.

INTRODUCTION

Articles of value, and particularly documents of value such as banknotes, cheques, passports, identification documents, certificates and licenses, are frequently the target of counterfeiters and persons wishing to make fraudulent copies thereof and/or changes to any data contained therein. Typically such documents are provided with a number of visible optical devices acting as security devices for checking the authenticity of the object. By "security device" we mean a feature which is not possible to reproduce accurately by taking a visible light copy, e.g. through the use of standardly available photocopying or scanning equipment. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of optical devices are those which produce an optically variable effect, meaning that the appearance of the device is different at different angles of view and/or illumination. Such devices are particularly effective as security devices since direct copies (e.g. photocopies) will not produce the optically variable effect and hence can be readily distinguished from genuine devices. Optically variable effects can be generated based on various different mechanisms, including holograms and other diffractive devices, moiré interference and other mechanisms relying on parallax such as venetian blind devices, and also devices which make use of focusing elements such as lenses, including moiré magnifier devices, integral imaging devices and so-called lenticular devices.

The present invention is directed to diffractive devices that produce an optically variable effect. When white light is incident upon a diffraction grating, it is split into its constituent wavelengths (i.e. colours) according to the diffraction grating equation:

$$P(\sin \theta_i \pm \sin \theta_d) = m\lambda, \qquad \text{(Equation 1)}$$

where P is the pitch of the grating elements of the diffraction grating (i.e. the spacing between adjacent grating elements), m is the diffraction order, $\lambda$ is the wavelength of light, and $\theta_i$ and $\theta_d$ are the angle of incidence and diffraction, respectively, of light measured relative to the plane normal of the diffraction grating. This effect can be used to generate optical devices that exhibit diffractive colour images at particular viewing ("tilt") angles corresponding to the angle of diffraction when the device is illuminated.

Rotating an optical device within its plane in order to observe an optically variable effect is an ergonomic and natural motion for an observer. Such an optically variable effect produced on rotation may be easily authenticable and yet difficult to counterfeit. However, when a diffractive device is rotated within its plane from a first position to a second position, the device typically has to be tilted in order to achieve the correct tilt angle for diffractive replay at the second position. This detracts from the optically variable effect indented to be perceived on rotation, and in some cases the effect may be unintentionally missed by the observer.

There is therefore a requirement to improve diffractive optical devices that exhibit an optically variable effect upon rotation.

SUMMARY OF THE INVENTION

In accordance with a first aspect of the invention there is provided an optical device that exhibits a variable optical effect upon illumination, comprising: a set of first grating regions, wherein each first grating region comprises a plurality of first grating elements, each first grating element having a principal component of orientation within the plane of the device that is substantially orthogonal to a first direction; a set of second grating regions, wherein each second grating region comprises a plurality of second grating elements, each second grating element having a principal component of orientation within the plane of the device that is substantially orthogonal to a second direction different to the first direction; wherein at least a subset of the first grating regions each exhibit a diffractive colour such that a user viewing the device at a viewing angle within a first viewing plane that intersects the optical device along the first direction perceives a first diffractive colour image; and at least a subset of the second grating regions are achromatic grating regions, wherein each achromatic grating region comprises a plurality of grating sub-regions having different respective grating element pitches ranging from a coarse pitch to a fine pitch and arranged such that, for a plurality of viewing angles within a second viewing plane that intersects the optical device along the second direction, the diffractive colours exhibited by the plurality of grating sub-regions cooperate such that the achromatic grating region is perceived to exhibit diffractive whiteness; and further wherein the set of first grating regions is interlaced with the set of second grating regions.

In this way, the present invention provides an optical device that exhibits a variable optical effect that is easily perceived upon rotation of the device within its plane. This is achieved using the subset of achromatic grating regions that exhibit diffractive whiteness when viewed at a plurality of viewing angles within the second viewing plane. A viewer may view the device at a particular viewing angle within the first viewing plane and observe the first colour image exhibited by the arrangement first grating regions. Upon rotating the device within its plane and viewing the device within the second viewing plane, the viewer perceives the diffractive whiteness exhibited by the achromatic grating regions across a wide range of viewing ("tilt") angles. In other words, having rotated the device, the viewer typically does not need to tilt the device in order to achieve the correct viewing angle within the second viewing plane to perceive the optical effect exhibited by the achromatic grating regions. This provides a striking optical effect that is ergonomic, easily authenticatable and yet difficult to counterfeit.

A particularly striking effect may be achieved in embodiments in which each of the second grating regions are achromatic grating regions. In such devices, the diffractive image that is perceived when viewing the device at a particular viewing angle along a first viewing direction (i.e. in within the first viewing plane) is perceived to disappear on rotation of the device, with the device exhibiting a substantially viewing angle-invariant diffractive whiteness when viewed within the second viewing plane.

The viewing angle of the device is typically varied by tilting the device about an axis within the plane of the device, and is typically measured as an angle from the plane normal of the device. In order to change the viewing angle, the viewer typically tilts the device about an axis substantially perpendicular to the intersection of the viewing plane with the device. This may be described as "vertical tilting". The change of viewing plane is typically achieved by rotating the device within its plane, i.e. rotating the device about its plane normal.

Each achromatic grating region comprises a plurality of grating sub-regions having different respective grating element pitches ranging from a coarse pitch to a fine pitch. In other words, the pitch of the grating elements within a sub-region is constant, and the pitch of one grating sub-region is different to the pitch of a different grating sub-region.

The grating sub-regions are arranged such that, for each of a plurality of viewing angles within a second viewing plane that intersects the optical device along the second direction, the diffractive colours exhibited by the plurality of grating sub-regions cooperate such that the achromatic grating region is perceived to exhibit diffractive whiteness. In other words, at a particular viewing angle within the second viewing plane, a plurality of grating sub-regions within an achromatic grating region replay a corresponding respective range of visible colours from the far red to the far blue within the visible spectrum. Upon viewing of the device, this range of colours exhibited by the plurality of grating sub-regions is perceived by the human eye to appear substantially white, whereby the achromatic grating region exhibits diffractive whiteness. Each individual grating sub-region will have its own diffractive spectrum (i.e. variance of diffracted wavelength (colour) with viewing angle) in accordance with Equation 1. Thus, due to the range of pitches from a coarse pitch to a fine pitch within an achromatic grating region, a plurality of grating sub-regions will replay a corresponding plurality of "rainbow" colours from the visible spectrum at substantially each angle of tilt within the second viewing plane. In this way, the human eye perceives an achromatic grating region to exhibit diffractive whiteness across substantially all viewing angles (vertical tilt angles) within the second viewing plane.

Herein, the visible part of the electromagnetic spectrum is considered to be between about 390 nm to 700 nm.

The arrangement of grating sub-regions and their respective pitches within an achromatic grating region may be such that: a first group of grating sub-regions comprises grating sub-regions corresponding to a first set of colour channels when viewed at a first viewing angle (e.g. within the respective viewing plane) which cooperate such that the achromatic grating region exhibits diffractive whiteness at said first viewing angle; and a second group of grating sub-regions comprises grating sub-regions corresponding to a second set of colour channels when viewed at a second viewing angle (e.g. within the respective viewing plane) different to the first viewing angle which cooperate such that the achromatic grating region exhibits diffractive whiteness at said second viewing angle. Preferably, the number and pitches of the grating sub-regions within an achromatic grating region will be such that, at a particular viewing angle, four or more grating sub-regions replay respective four or more colour channels which together are perceived to exhibit diffractive whiteness.

The first group and the second group of grating sub-regions may comprise one or more common grating sub regions. For example, at the first viewing angle, one grating sub-region may exhibit a red colour (i.e. colour channel) which in combination with the diffracted light from other grating sub-regions at the first viewing angle results in the achromatic grating region exhibiting diffractive whiteness. At a second viewing angle the same grating sub-region may exhibit a blue colour which in which in combination with other grating sub-regions at the first viewing angle results in the achromatic grating region exhibiting diffractive whiteness. In some embodiments, the number of colour channels that are replayed, and the colour channels themselves, may be substantially the same at each viewing angle. However, more typically the sets of colour channels may vary at different viewing angles. For example, at a first viewing angle, two grating sub regions may replay respective colour channels that cooperate such that diffractive whiteness is perceived, and at a second viewing angle, three or more grating sub regions may replay respective colour channels that cooperate with each other such that the device exhibits diffractive whiteness. Thus, the number of colour channels, and the colours of the channels themselves, replayed by each group of grating sub-regions may vary with viewing angle. At each viewing angle, the combination of colour channels replayed by the respective group of grating sub-regions cooperates such that diffractive whiteness is perceived across the domain of the achromatic grating region.

Typically, the plurality of grating sub-regions within each achromatic grating region comprises: a fine grating sub-region having a fine grating element pitch of less than or equal to 0.7 microns (~1429 lines per mm); a coarse grating sub-region having a coarse grating element pitch of greater than or equal to 3 microns (~333 lines per mm); and one or more intermediate grating sub-regions each having a grating element pitch that is between the coarse grating element pitch and the fine grating element pitch, and wherein the grating element pitches of the one or more intermediate grating sub-regions are different.

Preferably, the fine grating element pitch is less than or equal to 0.6 microns, more preferably less than or equal to 0.5 microns. Preferably, the coarse grating element pitch is greater than or equal to 4 microns, more preferably greater than or equal to 5 microns.

As can be seen from Equation 1, the fine grating sub-region diffracts incident light at a large angle away from the angle of specular reflection, whereas the coarse grating sub-region diffracts incident light through an angle very close to the angle of specular reflection (typically within ~6 degrees of the angle of specular reflection fora grating element pitch of greater than or equal to 5 microns). In this way, each achromatic grating region exhibits diffractive whiteness at a wide range of viewing angles (typically a range of at least 60 degrees) within the corresponding viewing plane.

It will be understood that the achromatic grating regions of the present invention exhibit the perceived diffractive whiteness when viewed at a plurality of viewing angles within the respective viewing plane, in the sense that the diffractive whiteness would be perceived at each of a plurality of viewing angles upon illumination by collimated light. This is in contrast to the diffractive image that, under illumination by collimated light, would be exhibited at a single viewing angle within the first viewing plane, in line with Equation 1. The range of grating element pitches within an achromatic grating region is typically such that the achromatic grating region exhibits diffractive whiteness for a range of viewing angles of at least 60 degrees. Both first order and second order diffracted light may contribute to the diffractive whiteness perceived by the observer. For example, at larger angles away from the angle of specular reflection, second order diffraction from the coarser grating sub-regions may replay at the same time as first order diffractive effects from the finer grating sub-regions. Under more diffuse lighting conditions, a greater number of grating sub-regions may replay at particular tilt angles, and at larger tilt angles, as compared to illumination with collimated light, thus enhancing the diffractive whiteness effect perceived by the viewer.

Each achromatic grating region typically comprises at least four intermediate grating sub-regions, more preferably at least seven intermediate grating sub-regions.

The relationship between the grating element frequencies of the grating sub-regions is typically linear. (Grating element frequency=1/grating element pitch.) Other relationships between the grating frequencies of the grating sub-regions within an achromatic grating region are envisaged, including non-linear relationships.

Typically, the grating sub-regions within an achromatic grating region are arranged in a substantially contiguous manner. In other words, the grating sub-regions within an achromatic grating region abut each other. Preferably, each grating sub-region within an achromatic grating sub-region has the same dimensions.

In embodiments, the grating elements of at least two grating sub-regions within an achromatic grating region have different orientations within the plane of the device. In other words, the grating elements of one grating sub-region each have a first orientation that is different to an orientation of the grating elements of a different grating sub-region. The grating regions and sub-regions of the device have a respective grating vector k that is perpendicular to the grating element orientation within the grating region or sub-region. The plane of dispersion of a grating region or sub-region (the plane within which white light is split into its component wavelengths) intersects the plane of the device along its grating vector. Thus, the grating vectors of grating sub-regions having different grating element orientations have different orientations, meaning that a viewer may perceive the diffractive whiteness at angles offset from the second viewing plane. This helps to achieve a smooth change in the optical effect that is exhibited by the device as it is rotated. Typically, the grating element orientations of grating sub-regions within an achromatic grating region are less than 30 degrees with respect to a direction orthogonal to the intended viewing direction, preferably less than 20 degrees and more preferably less than 10 degrees.

When viewing under diffuse (ambient) lighting conditions, grating elements that have a principal component of orientation perpendicular to the respective viewing plane, but are not exactly perpendicular to the viewing plane, will project a component of their plane of dispersion into the viewing plane.

Each first grating element has a principal component of orientation within the plane of the device that is substantially orthogonal to a first direction. Typically, each first grating element defines an angle of less than 30 degrees, preferably less than 20 degrees and more preferably less than 10 degrees with an axis that is orthogonal to the first direction. Each second grating element has a principal component of orientation within the plane of the device that is substantially orthogonal to a second direction, in the same manner, i.e. each second grating element is orientated such that it typically defines an angle of less than 30 degrees, preferably less than 20 degrees and more preferably less than 10 degrees with an axis that is orthogonal to the second direction.

The first and second directions are different. In other words, an observer is required to rotate the device within its plane in order to perceive the different optical effects exhibited when viewing the device within the first and second viewing planes. Preferably, the first and second directions are offset by an angle greater than or equal to 45 degrees, more preferably the first and second directions are offset by an angle of 90 degrees.

As described above, at least a subset of the first grating regions each exhibit a diffractive colour such that a first diffractive image is exhibited. These may be referred to as "image regions". In embodiments, each of the first grating regions may exhibit a diffractive colour (this may be the same colour). In alternative embodiments, a subset of the first grating regions are achromatic grating regions that are perceived to exhibit diffractive whiteness when viewed at a plurality of viewing angles within the first viewing plane. The achromatic grating regions of the first set of grating regions are identical to the achromatic grating regions described above, except that the grating elements have a principal component of orientation substantially orthogonal to the first viewing direction such that the diffractive whiteness is exhibited when viewing the device within the first viewing plane. In such embodiments, when viewing the device within the first viewing plane, the observer perceives a diffractive colour image against a white background.

As has been described above, a striking effect may be obtained if each of the second grating regions is an achromatic grating region. In some embodiments, each of a subset of the second grating regions may exhibit a diffractive colour such that a user viewing the device at a viewing angle within the second viewing plane perceives a second diffractive colour image. Thus, in such embodiments, when viewed within the second viewing plane, the device exhibits a (second) diffractive colour image (typically different to the first colour image) against a white background. Thus, the second grating regions may be seen to comprise image regions and achromatic regions.

In such embodiments, it is preferred that the positions of the achromatic grating regions of the first grating regions correspond to the positions of the achromatic grating regions of the second grating regions. Thus, upon rotation of the device within its plane, the viewer may perceive a change of image against a substantially invariant white background.

The image(s) exhibited by the device of the present invention may be in the form of a graphic representation or indicia, such as a letter, digit or other alphanumeric symbol.

The grating elements of the device may be linear. In embodiments, the grating elements within at least one achromatic grating region may be curved. Such curved grating elements may have a constant curvature, or may have varying curvature. Consequently, each point on a curved grating element provides a different grating vector orientation, such that the diffractive whiteness optical effect may be observed for a greater range of rotation viewing angles as compared to the use of linear grating elements. Typically, each grating element within an achromatic grating region has the same curvature. In embodiments where curved grating elements are used, the tangent to each point on the grating element typically has a principal component of orientation that is substantially orthogonal to the respective viewing direction.

Similarly, at least one first or second grating region that exhibits a diffractive colour may comprise curved grating elements, such that the diffractive image(s) may be perceived across a wider range of rotational viewing angles as compared with the use of linear grating elements.

Preferably, the dimensions of each grating region are such that they are not discernible to the naked human eye. The human eye is commonly understood to have an angular resolution of approximately 1 minute of ac. The means that an observer viewing the optical device at a distance of (generally) between 25 cm and 30 cm may resolve features having dimensions between approximately 75 microns and 100 microns, allowing for imperfections of the human eye. In this way, each grating region that forms part of a diffractive image may be considered to be an "image element", whereby the human eye perceives the combination of such image elements as the full diffractive image. Typically, each grating region has a maximum dimension of 70 microns, preferably 50 microns and even more preferably 30 microns.

Preferably, each grating sub-region has a maximum dimension of 25 microns, preferably 15 microns and even more preferably 10 microns. This ensures that the observed cannot resolve the individual grating sub-regions within an achromatic grating region and instead perceives a diffractive whiteness due to the "mixing" or superposition of light originating from the grating sub-regions, in the manner described above.

As set out above, the set of first grating regions is interlaced with the set of second grating regions. This allows the perceived change of appearance of the device upon rotation to occur in substantially the same location on the device. Typically, the set of first grating regions is interlaced with the set of second grating regions in a grid pattern, such that the first grating regions are interlaced with the second grating regions along two directions. The repeating dimension of the interlacing is preferably smaller than that resolvable by the naked human eye in order to avoid "macro" pattern artefacts being perceived when viewing the device. Thus typically, a repeat distance of the interlacing (e.g. the sum of the dimensions of adjacent first and second grating regions) is typically less than 100 microns, preferably less than 75 microns and more preferably 60 microns or less. Preferably, the first grating regions and the second grating regions are arranged in a substantially contiguous manner.

In some embodiments, the device may further comprise a set of third grating regions interlaced with the set of first grating regions and the set of second grating regions, wherein each third grating region comprises a plurality of third grating elements, each third grating element having a principal component of orientation within the plane of the device that is substantially orthogonal to a third direction positioned between the first direction and the second direction; wherein at least a subset of the third grating regions are achromatic grating regions that are perceived to exhibit diffractive whiteness when viewed at a plurality of viewing angles within a third viewing plane that intersects the optical device along the third direction.

The third direction is positioned between the first and second directions, preferably bisecting them. For example, if the first and second directions are offset by an angle of 90 degrees, the third direction may be oriented at 45 degrees to both the first and second directions. The use of such a set of third (or more) grating regions advantageously increases the smoothness of the change in optical effect perceived by the user.

The achromatic grating regions of the set of third grating regions are as described herein above. The achromatic grating regions of the third grating regions typically correspond to the achromatic grating regions of the second grating regions to ensure a smooth change in optical effect as the device is rotated within its plane. The arrangement of grating elements of the optical device forms a grating structure. The grating elements of the diffractive structure define alternate bands of maxima and minima. The bands may take the form of alternating high and low optical densities (e.g. opaque bands spaced by transparent bands), in which case the diffractive effect will operate on the principle of amplitude-difference and the diffractive structure of the device is a transmission amplitude grating structure. Alternating bands of high and low reflectivity would form a reflective amplitude grating structure. The grating elements may be in the form of physical peaks and troughs forming a surface relief, in which case the structure will be a phase-difference diffractive structure. In both cases the structure will be formed in or on a carrier, such as a layer of lacquer or resin. Where the structure is formed as a surface relief on the carrier, preferably a reflection-enhancing layer (such as metal or a high refractive index material) will be applied so as to follow the contours of the relief, to improve its visibility.

The surface relief may have different profiles, such as a sinusoidal, rectangular or triangular profile. The type of surface relief profile may affect diffraction efficiency, but it is the pitch of the grating elements that determines the angular dispersion or "spread" of colours—and hence the colour exhibited by a region at a particular tilt angle about the first axis. Typically the profile depth of a surface relief defining the grating elements is no greater than 1 micron, preferably no greater than 0.5 microns.

In embodiments, the device of the present invention may further comprise a set of non-diffractive regions, wherein each non-diffractive region comprises an absence of grating elements. Such non-diffractive regions typically comprise a uniform (e.g. planar) metallisation and exhibit substantially the same optical appearance (typically black) at substantially all angles of view of the device (i.e. all rotational angles and all tilt angles). The non-diffractive regions may be used to augment the variable optical effect, or provide further information, for example. The non-diffractive regions may be interlaced with the grating regions. Typical dimensions of such non-diffractive regions are substantially equal to the dimensions of the grating regions, with the eye perceiving a plurality of such non-diffractive regions in combination.

Particularly preferably, the optical device of the present invention is a security device. In other words, the security device may be used to prevent copying or counterfeiting of an article or document to which it is applied. Typically, a "security device" is not possible to reproduce accurately by taking a visible light copy, e.g. through the use of standardly available photocopying or scanning equipment.

In accordance with a second aspect of the invention there is provided a security article comprising a security device according to the invention, wherein the security article is preferably formed as a security thread, strip, foil, insert, patch, or substrate for a security document.

In accordance with a third aspect of the invention there is provided a security document comprising a security device or a security article according the invention, the security document preferably comprising a banknote, cheque, passport, identity card, certificate of authenticity, fiscal stamp or another document for securing value or personal identity. Typically, the security document comprises a substrate with a transparent window portion and the security device or security article is located at least partially within the transparent window portion.

In accordance with a fourth aspect of the invention, there is provided a method of manufacturing an optical device that exhibits a variable optical effect upon illumination, the method comprising: forming a diffractive structure in a carrier layer, the diffractive structure comprising: a set of first grating regions, wherein each first grating region comprises a plurality of first grating elements, each first grating element having a principal component of orientation within the plane of the device that is substantially orthogonal to a first direction; a set of second grating regions, wherein each second grating region comprises a plurality of second grating elements, each second grating element having a principal component of orientation within the plane of the device that is substantially orthogonal to a second direction different to the first direction; wherein at least a subset of the first grating regions each exhibit a diffractive colour such that a user viewing the device at a viewing angle within a first viewing plane that intersects the optical device along the first direction perceives a first diffractive colour image; at least a subset of the second grating regions are achromatic grating regions, wherein each achromatic grating region comprises a plurality of grating sub-regions having different respective grating element pitches ranging from a coarse pitch to a fine pitch and arranged such that, for a plurality of viewing angles within a second viewing plane that intersects the optical device along the second direction, the diffractive colours exhibited by the plurality of grating sub-regions cooperate such that the achromatic grating region is perceived to exhibit diffractive whiteness; and further wherein; and further wherein the set of first grating regions is interlaced with the set of second grating regions.

The resulting device provides all of the benefits already discussed above.

In preferred embodiments the diffractive structure is formed by: providing a replication tool having a surface relief defining the diffractive structure; and using the replication tool to form the surface relief of the carrier layer according to the surface relief, and preferably applying a reflection enhancing layer onto the carrier layer so as to follow the contours of the surface relief. The replication tool may be manufactured by creating the surface relief in a recording medium and preferably transferring the surface relief to the surface of the replication tool.

The surface relief may be formed in the recording medium using maskless lithography such as electron beam lithography or direct laser writing. Electron beam lithography and direct laser writing can produce grating elements with pitches or spacings less than 0.5 microns.

BRIEF DESCRIPTION OF THE DRAWINGS

Exemplary embodiments of the invention will now be described, by way of example only, with reference to the appended Figures, in which:

FIGS. 4 to 7 illustrate example devices according to the invention together with magnified views of regions of their diffractive structures;

FIGS. 11 to 13 illustrate examples of incorporating security device according to the invention into security documents.

DETAILED DESCRIPTION

As had been described above, grating regions of the optical device according to the invention may have various different forms (e.g. amplitude- or phase-based). The following description will focus on diffractive structures formed as a surface relief (i.e. phase-difference devices rather than amplitude-different devices) since these lend themselves well to large volume replication. Throughout the figures, the lines used to illustrate individual grating elements are schematic and do not necessarily indicate the exact number of grating elements within a grating region or grating sub-region. The lines used to illustrate the individual grating elements represent the maximum heights, or "peaks", of the surface relief.

Figure 1A:
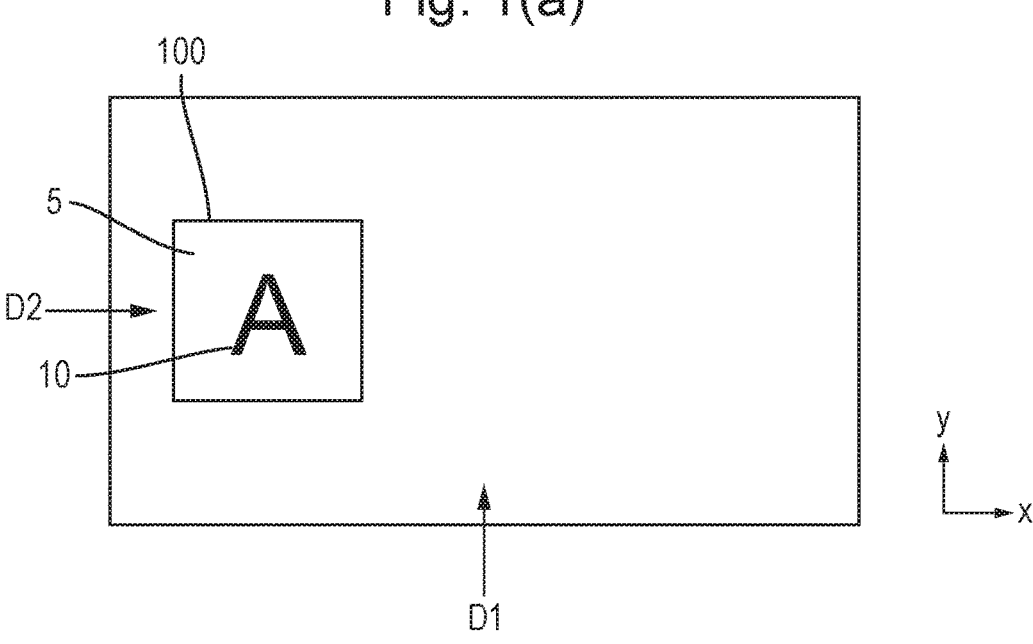
FIGS. 1(a) and 1(b) illustrate plan views of a security document comprising a security device according to the invention.

FIG. 1(a) is a plan view of a security document 1000 (here in the form of a banknote) comprising an optical device 100 according to the present invention. Here, the optical device is used to help prevent forgery, copying or counterfeiting of the banknote, and is therefore a security device. When the device is viewed within a viewing plane that intersects the banknote along viewing direction D1 (which in FIG. 1(a) is parallel to the y-axis), the device exhibits a diffractive image 10 against a diffractive white background 5. The diffractive image—in this example a red alphanumerical character "A"— is perceived at a particular viewing angle θ within the viewing plane that corresponds to the pitch of the grating elements forming the image. The viewing angle θ (measured from the plane normal of the device 100) may be varied by tilting the banknote—and therefore the device—about an axis substantially orthogonal to the viewing direction (i.e. by tilting about a tilt axis parallel with the x-axis). This is typically referred to as "vertical" tilting.

Figure 1B:
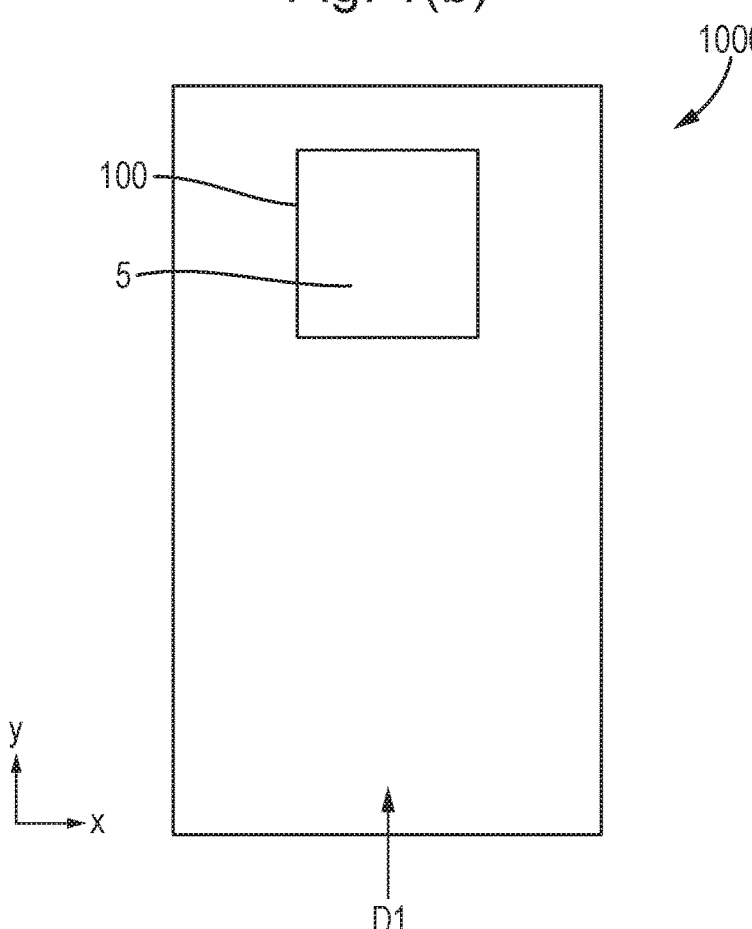

FIG. 1(b) illustrates the same banknote 1000 when it has been rotated 90 degrees within its plane. In other words, the banknote has been rotated 90 degrees about an axis parallel to the plane normal of the device (z axis). When the viewer views the device within a viewing plane intersecting the banknote along the viewing direction D1, the image 10 is no longer visible, and device 100 is perceived to exhibit a uniform diffractive whiteness. The diffractive whiteness is exhibited over a wide range of viewing angles (typically greater than 60 degrees) within the viewing plane as the banknote is tilted about the x-axis. It will be appreciated that rotating the device through 90 degrees as illustrated in FIGS. 1(a) and 1(b) is equivalent to maintaining the device in the orientation shown in FIG. 1(a) and viewing the device within a second viewing plane that intersects the device along a viewing direction D2 that is orthogonal to direction D1.

Figure 2:
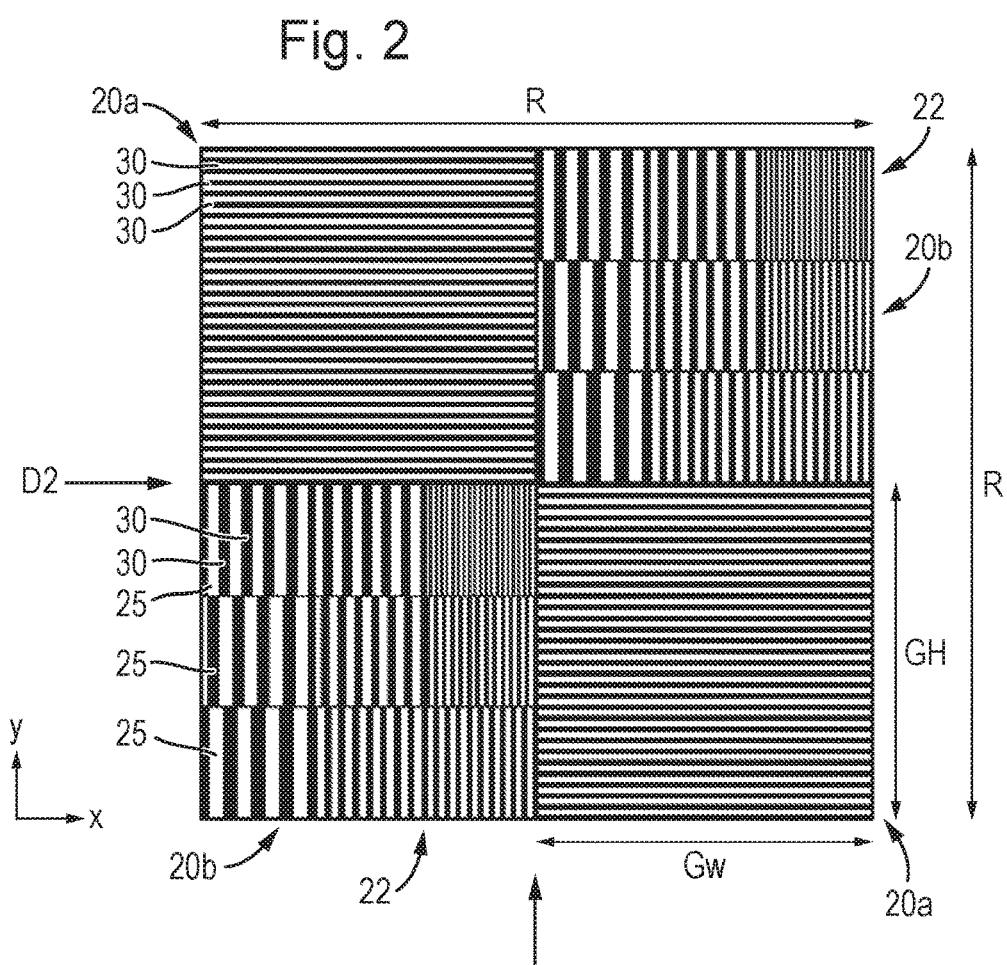
FIG. 2 is a magnified view of the diffractive structure within a portion of a device according to the invention.

FIG. 2 illustrates the grating structure of a portion of the device 100, in the orientation of the device shown in FIG. 1(a). The device 100 comprises a set of first grating regions 20a that are interlaced with a set of grating regions 20b, with the interlacing being along two orthogonal directions. The first grating regions 20a each comprise a plurality of linear grating elements (shown generally at 30) that are orientated within the plane of the device perpendicular to the first viewing direction D1. The second grating regions 20b each comprise a plurality of linear grating regions that are orientated within the plane of the device at 90 degrees to the orientation of the grating elements within the first grating regions. The grating elements within the second grating regions are therefore orientated substantially perpendicular to the second viewing direction D2.

In this example each grating region 20a, 20b of the device has square geometry (such that its width $G_W$ is equal to its height $G_H$), and has dimensions of 30 microns×30 microns, well below the resolution of the unaided human eye. The repeat distance R of the interlacing in both interlacing directions is 60 microns, which again is below the resolution of the naked human eye. This ensures that the observer does not perceive unintentional large-scale "macro" patterns within the device.

The first grating regions 20a correspond to individual image elements which in combination are perceived to exhibit the red letter "A" shown in FIG. 1(a) when the device is viewed along viewing direction D1. The pitch, P, of the grating elements within the first grating regions is chosen in accordance with Equation 1 such that the image appears red at the desired viewing angle (typically an angle θ of between 30 degrees and 60 degrees from the device normal). Thus, the first grating regions in this part of the device may be referred to as "image regions".

When the device 100 is rotated within its plane (or alternatively the viewer views the device along viewing direction D2), the diffractive effects of the second grating regions 20b are perceived since the grating elements in the second grating regions are now orientated perpendicular with the viewing direction D2 such that their grating vectors lie within the viewing plane.

As was described with reference to FIG. 1(b), the optical effect perceived by the viewer when viewing the device along viewing direction D2 (or, alternatively, rotating the device 90 degrees), is a uniform diffractive white colour that is viewable over wide range of tilt angles θ. This is achieved through the use of "achromatic grating regions" 22, which will be explained below. In the example device of FIGS. 1 and 2, each second grating region is in the form of an achromatic grating region.

Figure 3:
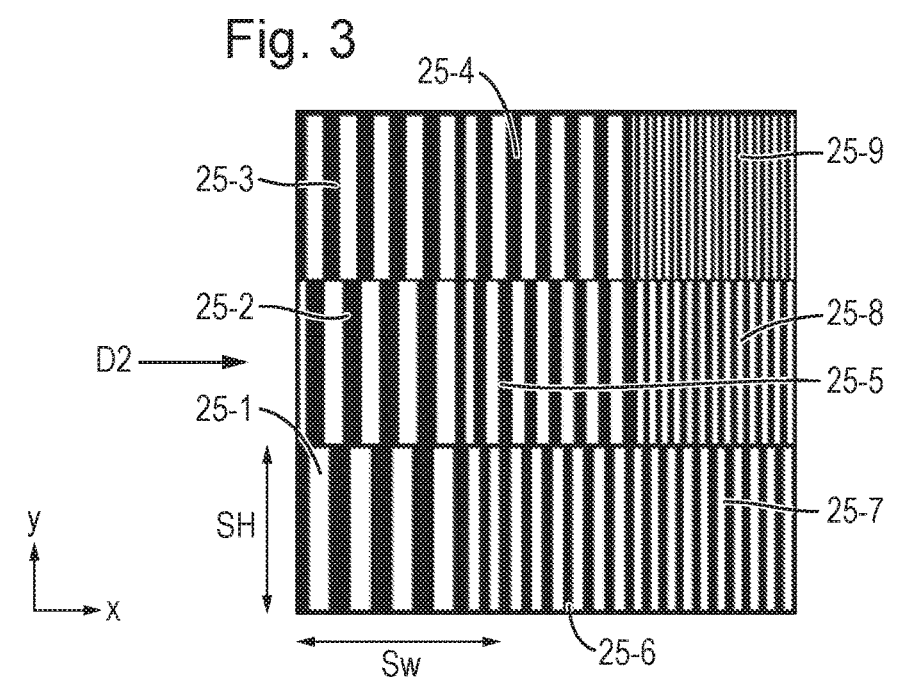
FIG. 3 is a magnified view of an achromatic grating region according to the invention.

FIG. 3 is a magnified view of such an achromatic grating region 22. The achromatic grating region 22 comprises a plurality of grating sub-regions 25 arranged in a 3×3 grid. In this example each grating sub-region has a square geometry (such that its width $S_W$ is equal to its height $S_H$) and has dimensions of 10 microns×10 microns, well below the resolution of the unaided human eye such that the viewer will perceive the combined effect of the grating sub-regions across the domain of the achromatic grating region.

In this example, the achromatic grating region 22 is made up of nine grating sub regions 25, with respective pitches ranging from a coarse pitch (sub-region 25-1) to a fine pitch (sub-region 25-9). Grating sub-region 25-1 has a grating element pitch of 5 microns, which is the coarsest pitch in the achromatic grating region (fewest number of lines per mm). Grating sub-region 25-9 has a grating element pitch of 0.6 microns, which is the finest pitch in the achromatic grating region (greatest number of lines per mm). The intermediate grating sub-regions 25-2, 25-4, 25-5, 25-6, 25-7 and 25-8 each have respective grating element pitches that decrease one to the next between the coarse pitch of sub-region 25-1 to the fine pitch of sub-region 25-9. The grating frequency (=1/grating pitch) typically varies from one grating sub-region to the next in a linear fashion.

We now consider the observed effect of the achromatic grating region when it is subject to overhead illumination, in which case $\theta_i$ is 0 degrees and the diffraction equation (Equation 1) simplifies to:

$$P \sin \theta_d = m\lambda.$$

For small diffraction angles $\theta_d$ (corresponding to small tilt angles, e.g. less than ~10 degrees), the coarse sub-region 25-1 will replay light at the far red of the visible spectrum (~700 nm). At these viewing angles, sub-regions 25-2, 25-3 and 25-4 may also replay within the visible spectrum, with the replayed light shifting increasingly towards the far blue of the visible spectrum (~390 nm) from sub-region 25-2 to sub-region 25-4 as the sub-region pitch decreases. At these viewing angles, the remainder of the grating sub-regions with finer pitch will typically not replay within the visible part of the spectrum. Consequently, a viewer will perceive the replayed light from sub-regions 25-1, 25-2, 25-3 and 25-4, in combination, to exhibit diffractive whiteness. In this way, at the particular viewing angle, each sub-region that replays within the visible spectrum may be considered to correspond to a "colour channel" that in combination combine, or superpose, to exhibit diffractive whiteness.

For larger diffraction angles $\theta_d$ (corresponding to large tilt angles, e.g. greater than 50 degrees), the fine sub-region 25-9 will replay light towards the far blue of the visible spectrum. At these viewing angles, sub-regions 25-8, 25-7 and 25-6 may replay light shifting increasingly towards the red end of the visible spectrum as the sub-region pitch increases from sub-region 25-8 to sub-region 25-6. The remaining sub-regions having a coarser pitch will typically not replay within the visible spectrum. In the same manner as described above for small viewing angles, the resulting perceived effect is a diffractive whiteness across the domain of the achromatic grating region.

For intermediate viewing angles, grating sub-regions 25-3, 25-4, 25-5 and 25-6 may replay a plurality of rainbow colours across the visible spectrum (from the far red to the far blue, respectively) such that again, the achromatic grating region 22 exhibits diffractive whiteness. The remainder of the grating sub-regions with the coarsest and finest grating element pitches may not replay within the visible spectrum at such tilt angles. It is noted that sub-region 25-3, which replayed "blue light" at small tilt angles now replays "red light". Similarly, sub-region 25-6, which replayed "red light" at large tilt angles, now replays "blue light". This is an example of how each grating sub-region will replay through its own diffractive spectrum as the device is tilted such that at a particular viewing angle, a combination of replaying sub-regions cooperate such that the achromatic grating region appears white.

The large range of pitches of the grating sub-regions (i.e. from the coarse pitch of 5 microns to the fine pitch of 0.6 microns) ensures that the diffractive whiteness is exhibited over a large range of different. viewing angles.

In the example achromatic grating region 22 of FIG. 3, the pitches of the sub-regions are shown to vary in a descending (coarse to fine) manner from one sub-region to the next, from coarse sub-region 25-1 to fine sub-region 25-9. However, such a regular arrangement is not required and the sub-regions may be arranged in substantially any order within the achromatic grating region.

In the present example, the device 100 exhibits a red letter "A" against a diffractive whiteness background when viewed along viewing direction D1, and a uniform diffractive whiteness appearance across the entire device when rotated 90 degrees or viewed along viewing direction D2. Thus, the set of first grating regions 20*a* comprises a plurality of achromatic grating regions in addition to the "red" grating regions shown in FIG. 2 and described above. The set of second grating regions 20*b* is made up entirely of achromatic grating regions such that the device appears a uniform white when rotated by 90 degrees. However, different arrangements of grating regions may be used in order to provide a wide range of variable optical effects on rotation of the device, as will now be further described.

Figure 4:
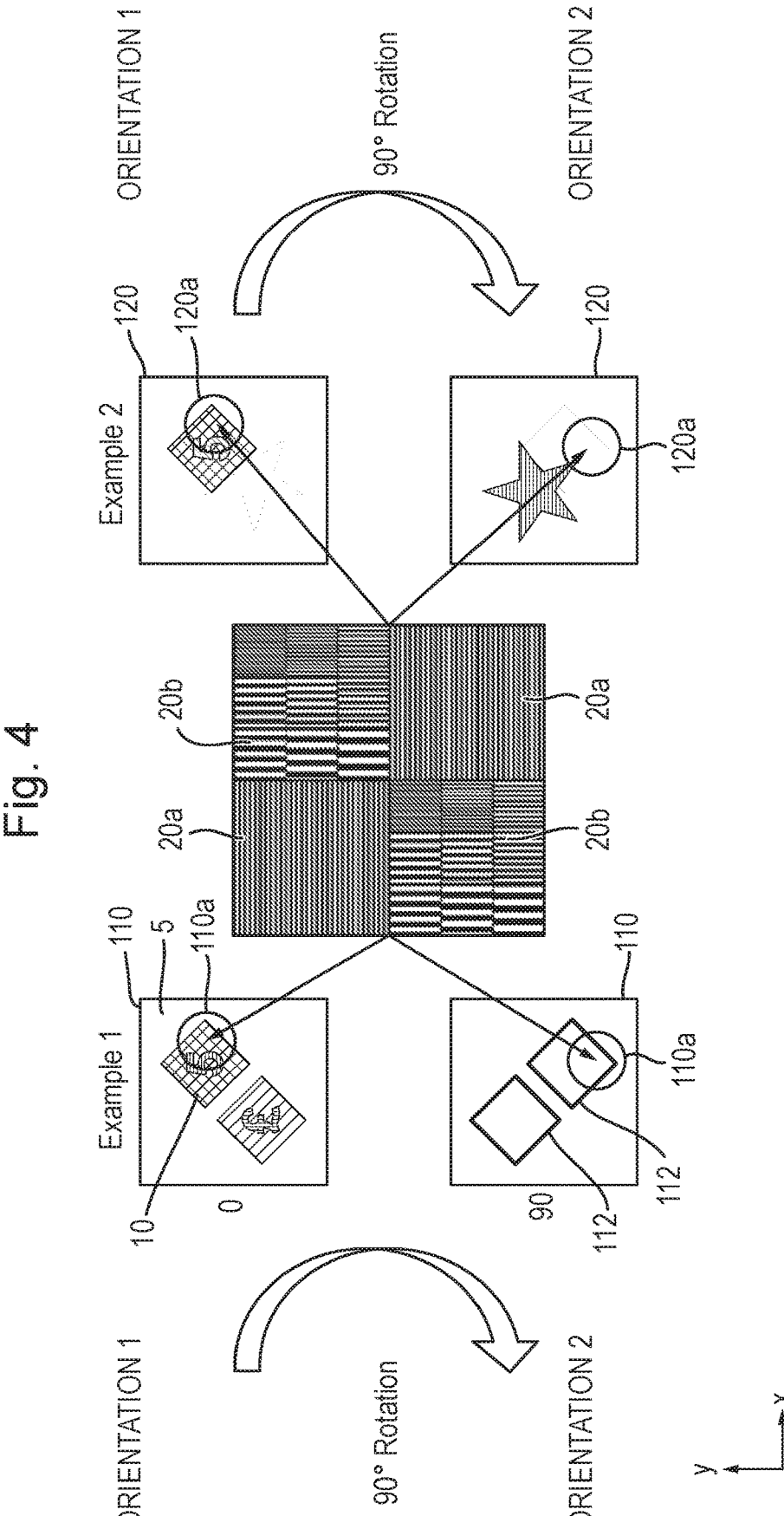

FIG. 4 illustrates two example optical devices 110, 120 according to the invention, and a region of their diffractive structure shown in magnified view. Considering first the device 110 of "Example 1", when the device is orientated in Orientation 1, a viewer perceives an image 10 (here an orange diamond with a green "£" character and a blue diamond with a red "5" character) against a diffractive white background 5. When the device is rotated by 90 degrees to Orientation 2, the viewer perceives a diffractive white background with black outlines of the diamonds remaining. The diffractive structure shown in FIG. 4 corresponds to region 110*a* of the device, and is shown in Orientation 1. In this region of the device, the first grating regions 20*a* comprise a plurality of grating elements having a pitch such that region 110*a* exhibits diffractive blue at a particular viewing angle when the device is viewed in Orientation 1, and each second grating region 20*b* is an achromatic grating region 22. When the device is rotated 90 degrees and viewed in Orientation 2, the achromatic second grating regions—that are interlaced with the first grating regions 20*a*—replay such that the same region 110*a* of the device exhibits diffractive whiteness. The device also comprises non-diffractive regions 112 corresponding to the outlines of the diamonds that were perceived in the initial image. These are visible in Orientation 1 and Orientation 2 and may comprise a uniform planar metallisation.

In the device 120 of Example 2, the illustrated diffractive structure corresponds to region 120*a* (again, shown in Orientation 1). In the same manner as the device 110 of Example 1, the first grating regions 20*a* exhibit a diffractive blue at a particular viewing angle when the device is viewed in Orientation 1. As the device is rotated 90 degrees within its plane, the achromatic second grating regions 22 replay and the same region 120*a* of the device 120 is perceived to exhibit diffractive whiteness over a large range of viewing angles within the viewing plane.

Figure 5:
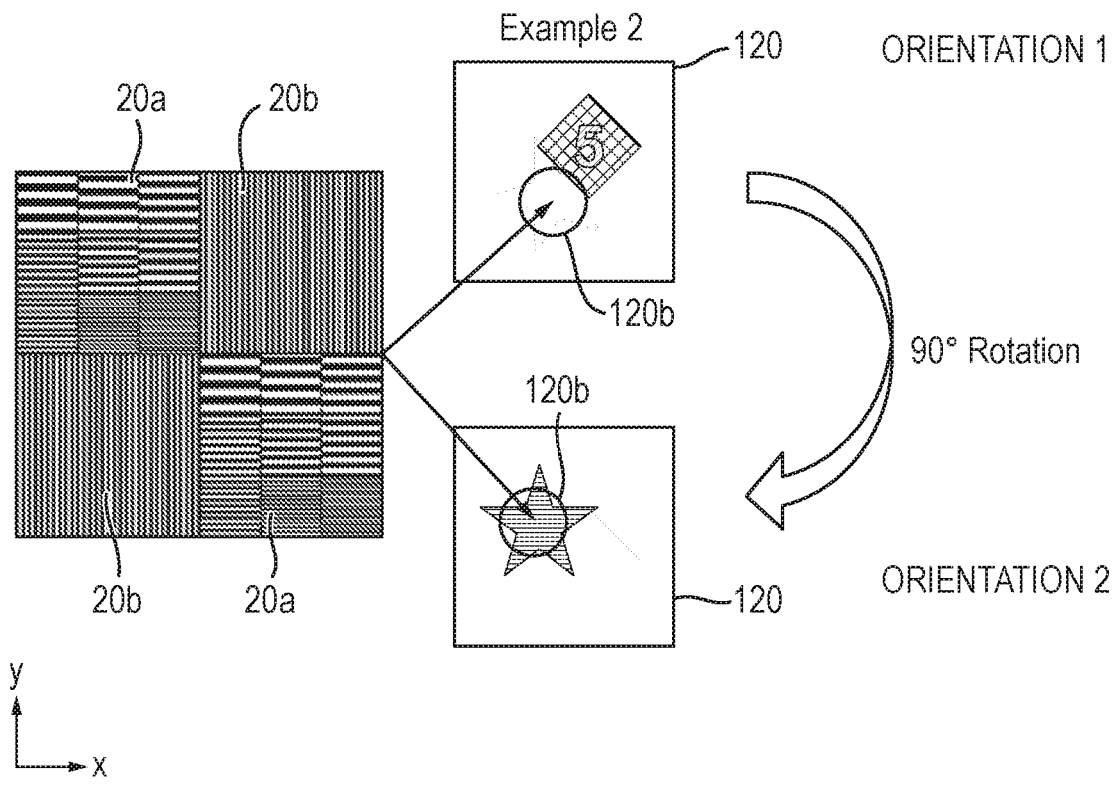

In the device 120 of Example 2, region 120*b* changes from diffractive white in Orientation 1, to a red colour in Orientation 2. The diffractive structure of this region of the device (illustrated in Orientation 1) is shown in FIG. 5. Here, the first grating regions 20*a* are achromatic grating regions 22 as discussed above, and the second grating regions 20*b* interlaced therewith comprise grating elements having a pitch such that they exhibit diffractive red at a particular tilt angle when the device 120 is viewed in orientation 2. Here, each second grating region 20*b* forms an "image element" of an image: here a star shape.

Figure 6:
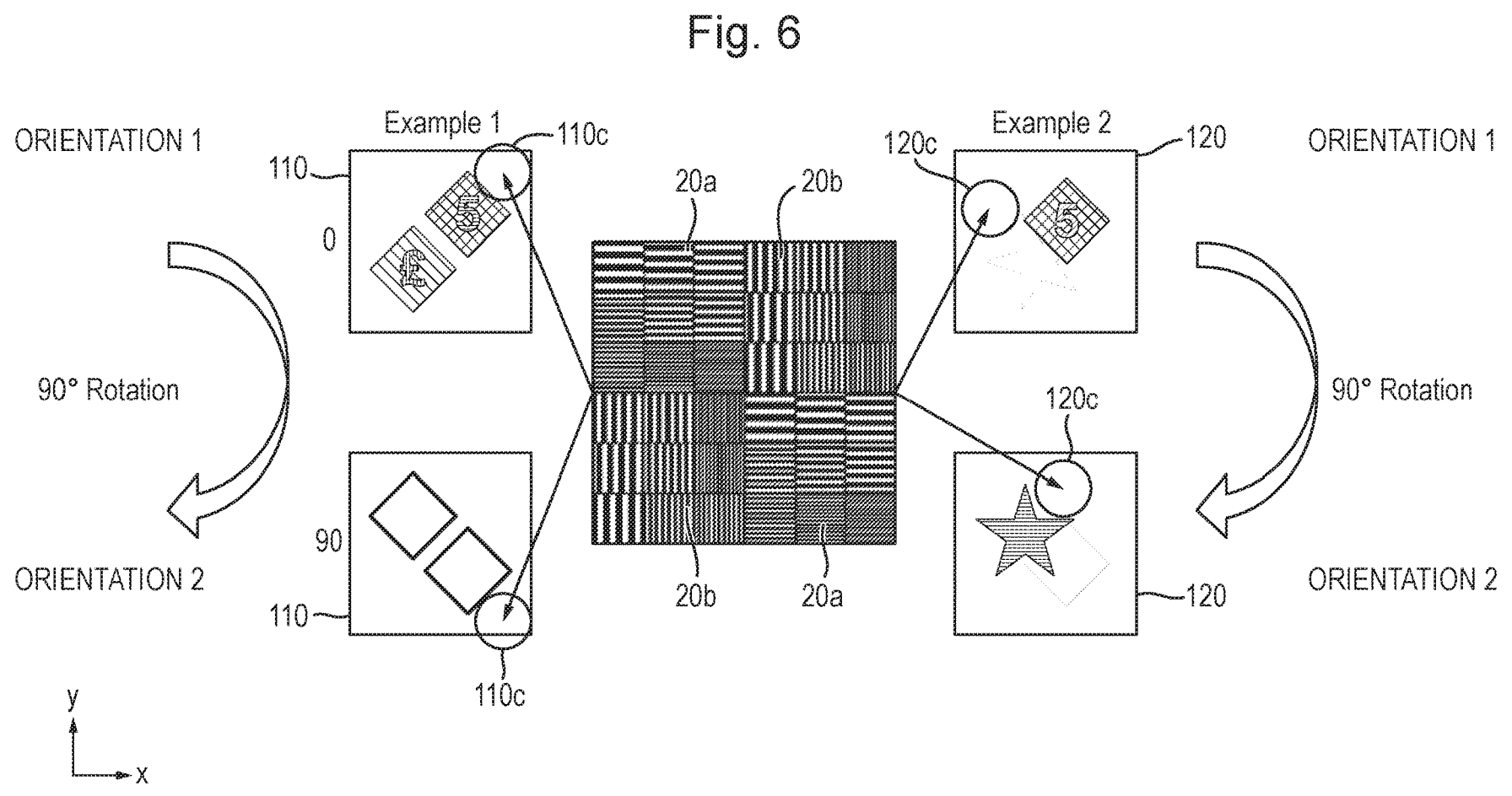

The devices 110 and 120 of Examples 1 and 2 both comprise regions (110*c* and 120*c* respectively) that exhibit invariant diffractive whiteness when the device is rotated from Orientation 1 to Orientation 2. The diffractive structure of these regions of the devices (shown in Orientation 1) is illustrated in FIG. 6, where both the first grating regions 20*a* and the second grating regions 20*b* are in the form of achromatic grating regions 22.

Figure 7:
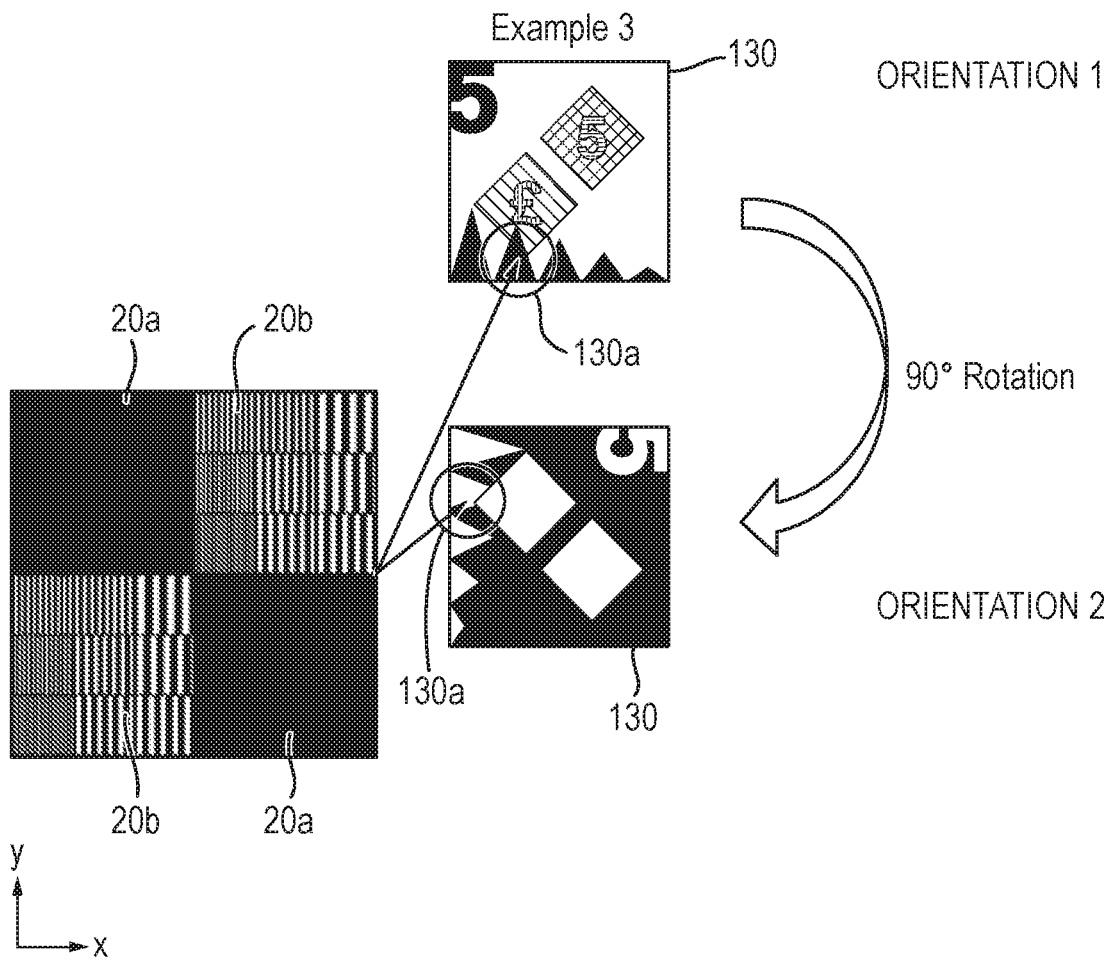

FIG. 7 illustrates an example device 130 ("Example 3") according to the invention, a part of which exhibits a black to white "contrast switch" effect when rotated 90 degrees from Orientation 1 to Orientation 2. As shown in FIG. 7, region 130*a* of device 130 (which is in the form of a triangle) exhibits uniform black when the device in is Orientation 1, which switches to diffractive whiteness when the device is rotated 90 degrees to Orientation 2. This region 130*a* of the diffractive structure 130 is illustrated in Orientation 1. The first regions 20*a* comprise a uniform metal surface and are absent of grating elements, whereby the regions 20*a* typically appear black at substantially all device orientations and viewing angles. The second grating regions 20*b* are in the form of achromatic grating regions 22, such that a viewer of region 130*a* of the device in Orientation 2 perceives diffractive whiteness over a wide range of tilt angles. In Orientation 2, the perceived diffractive whiteness dominates over the appearance of the metallised regions 20*a*.

Figure 8:
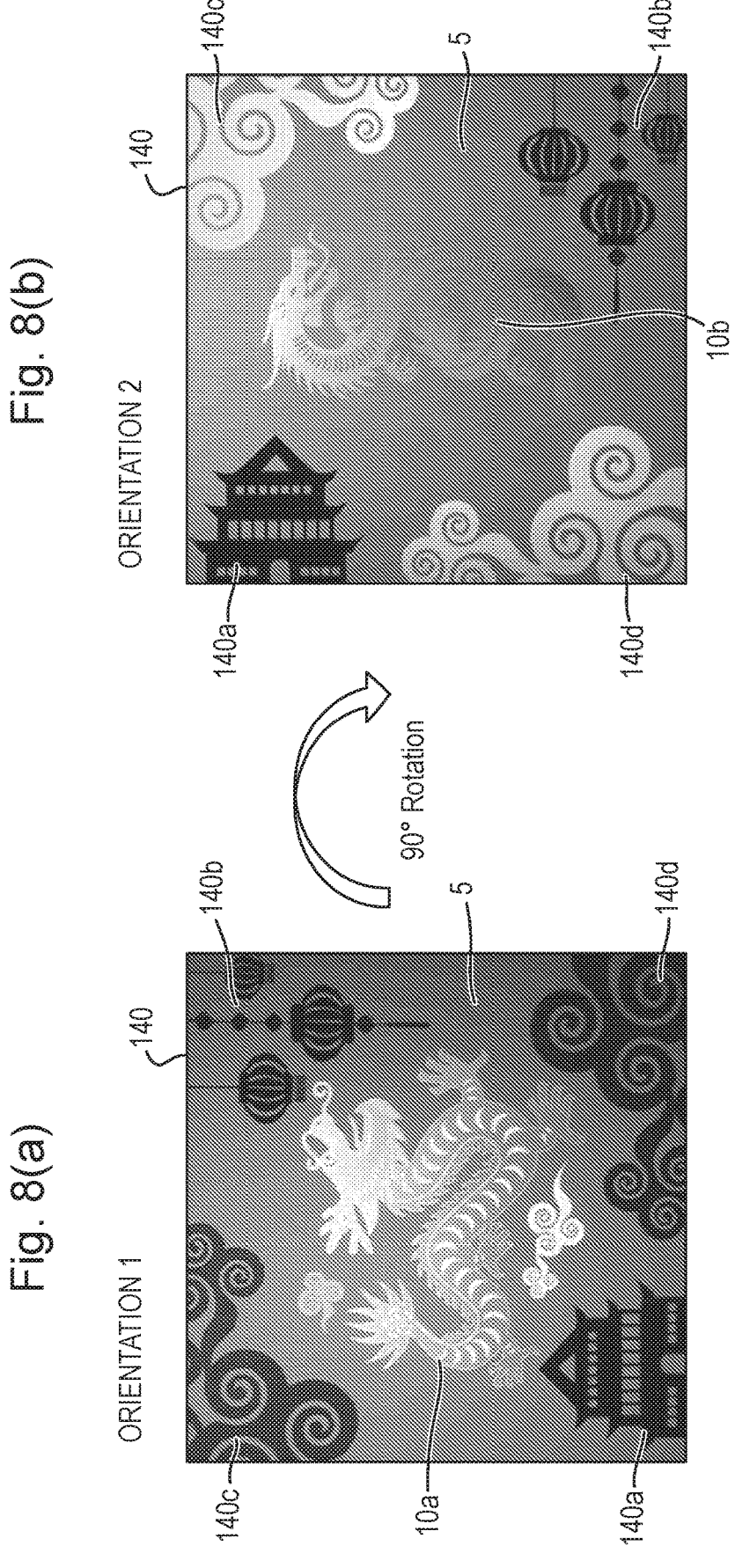
FIGS. 8(a) and 8(b) illustrate the variable optical effect of a device according to a further embodiment of the invention.

FIGS. 8(*a*) and 8(*b*) illustrate a further example of a device 140 according to an embodiment of the invention. FIG. 8(*a*) illustrates the device when viewed in a first orientation (Orientation 1), and FIG. 8(*b*) illustrates the same device 140 when rotated 90 degrees within its plane (Orientation 2). In Orientation 1, the device exhibits a first image of a dragon 10*a* against a diffractive white background 5. When rotated by 90 degrees to Orientation 2, a second image of a different dragon 10*b* is perceived in substantially the same region of the device as image 10*a*. Again, image 10*b* is perceived against a diffractive white background. This is a particularly striking effect that is easily authenticatable and yet difficult to counterfeit. This striking change of image in substantially the same location of the device against a substantially invariant diffractive whiteness background is achieved through the interlacing of the first and second diffractive regions and the use of achromatic grating regions as described above. In this example, the set of first grating regions and the set of second grating regions each comprise grating regions corresponding to the respective image, as well as achromatic grating regions.

In addition to the change of image 10*a* to 10*b* against a substantially invariant diffractive white background, the device 140 also exhibits non-diffractive regions whose optical appearance is conserved upon rotation (regions 140*a* and 140*b*), as well as regions that change from a uniform black with viewed in Orientation 1 to a diffractive colour when the device is viewed in Orientation 2 (regions 140*c* and 140*d*). The diffractive structure of regions 140*c* and 140*d* will comprise planar metallised regions interlaced with grating regions having a pitch corresponding to the diffractive colour that is perceived in Orientation 2.

In the examples described so far, each of the grating elements has been linear, with the grating elements of the first and second grating regions being orientated substantially perpendicular to each other. In this way, the desired optical effects are perceived when viewing the device along viewing directions that are 90 degrees offset from each other (or equivalently by rotating the device by 90 degrees). In embodiments, the grating elements within a grating region may be curved, and/or have different orientations within the plane of the device, as will now be described.

Figure 9:
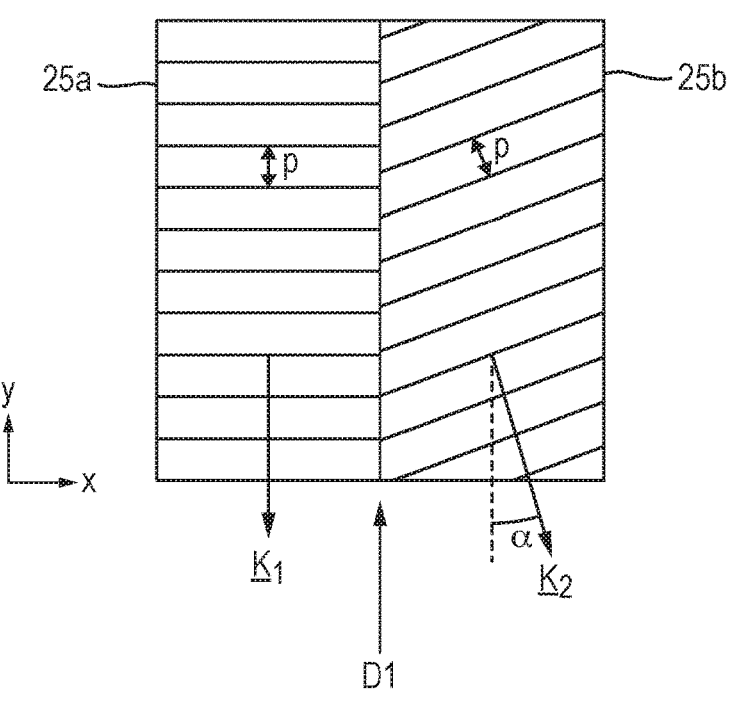
FIG. 9 is a magnified view showing grating sub-regions comprising grating elements having different orientations.

Each grating element of the device defines a grating vector k that is perpendicular to the orientation of the grating element. The plane of dispersion of the respective grating region or grating sub-region—which is the plane within which incident white light is split into its component wavelengths—intersects the plane of the device along its grating vector k. FIG. 9 schematically illustrates two adjacent grating sub-regions 25a and 25b within an achromatic grating region 22. The grating elements within grating sub-region 25a each have an orientation that is parallel with the x-axis, and so the grating vector $k_1$ and the plane of dispersion is orientated along the y-axis. In grating sub-region 25b, each grating element is offset by an angle $\alpha$ (typically 30 degrees of less) from those of sub-region 25a, and therefore define a grating vector $k_2$ that is offset from grating vector $k_1$ by angle $\alpha$. Consequently, an observer viewing the device within a viewing plane that intersects the device along viewing direction D1 (here parallel with the y-axis) will firstly observe grating sub-region 25a since its grating vector aligns with the D1. As the device is rotated within its plane through an angle $\alpha$, the grating vector $k_2$ of the grating sub-region 25b aligns with the viewing direction and thus the observer perceives region 25b.

Under illumination by collimated light, each grating sub-region 25a, 25b would replay at different discrete angles of rotation $\alpha$. However, in typical ambient lighting conditions which is highly diffuse, at particular angles of rotation $\alpha$, typically more than one grating sub-region will be visible to a certain degree, with the individual planes of dispersion being projected onto the viewing plane.

In this manner, grating sub-regions within an achromatic grating region may have grating elements that are azimuthally offset from each other, such that the achromatic grating region exhibits diffractive whiteness through a range of rotation angles. This is particularly effective for regions of a device that replay an invariant diffractive white upon rotation through a large angle such as 90 degrees (e.g. as described with reference to FIG. 6), as the diffractive whiteness will be replayed as the device is rotated through a range of angles corresponding to the orientations of the grating elements, rather than "switching on" at 90 degree rotation. In some examples, the device may comprise further set(s) of achromatic regions with grating elements orientated at angles(s) between 0 degrees and 90 degrees from the principal orientation of the first diffractive regions in order that the diffractive whiteness remains exhibited as the device is rotated within its plane. For example, the device may comprise a set of achromatic regions orientated at 45 degrees to the (orthogonal) principal orientations of the first diffractive regions and the second diffractive regions.

Figures 13A, 13B, 13C, 14:
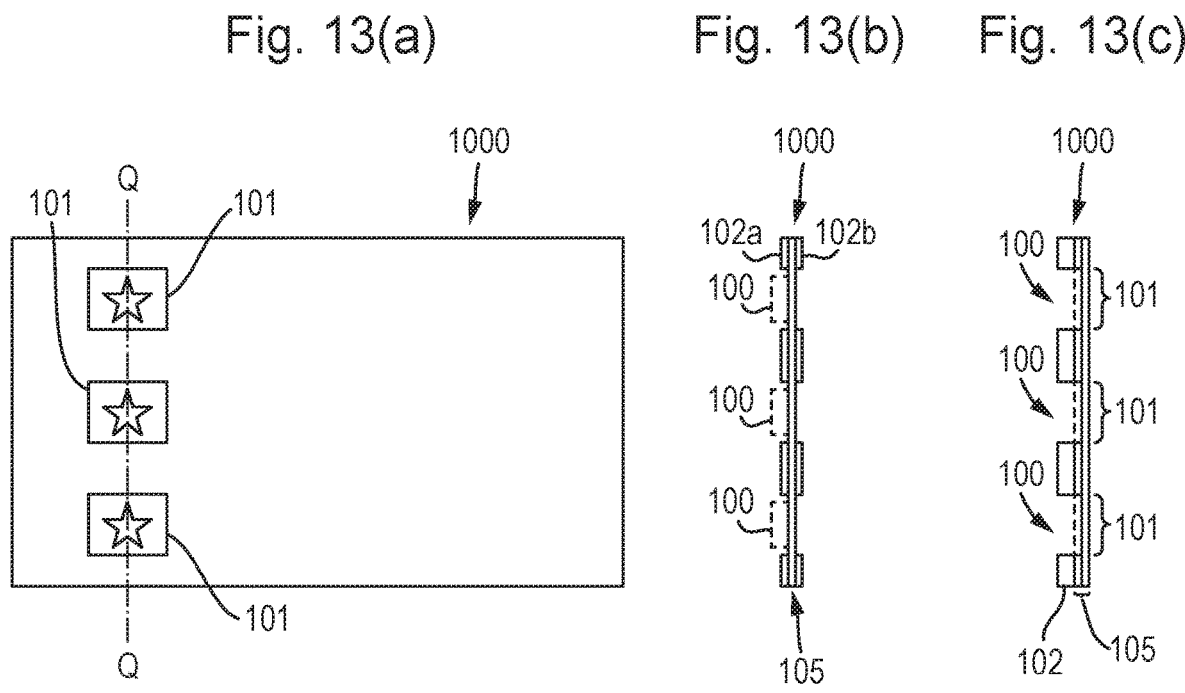
FIG. 14 schematically illustrates the interlacing of three sets of grating regions according to an embodiment of the invention.

Such an arrangement is schematically illustrated in FIG. 14, where a set of first grating regions 20a and a set of second grating regions 20b are interlaced with a set of third grating regions 20c. The grating elements of the first grating regions 20a are oriented substantially perpendicular to a first direction D1, the grating elements of the second grating regions 20b are orientated substantially perpendicular to a second direction D2 (which is orthogonal to D1), and the grating elements of the third grating regions are orientated substantially perpendicular to a third direction D3 which defines an angle of 45 degrees with both the first and second directions. In this example, both the second 20b and third 20c grating regions are achromatic grating regions (although for simplicity only the respective orientations of the grating elements are illustrated). In this way, the device exhibits a diffractive image when viewed in a viewing plane intersecting the device along D1, and exhibits a smooth change to diffractive whiteness when rotated within its plane.

A similar effect where the diffractive whiteness exhibited by an achromatic grating region is perceived to be maintained through a range of rotation angles of the device may be achieved by using curved grating elements, such that the grating sub-region defines a continuum of grating vectors that are perpendicular to the tangent to each point on the curve. Typically each grating element within such a grating region has the same radius or curvature.

Figure 10:
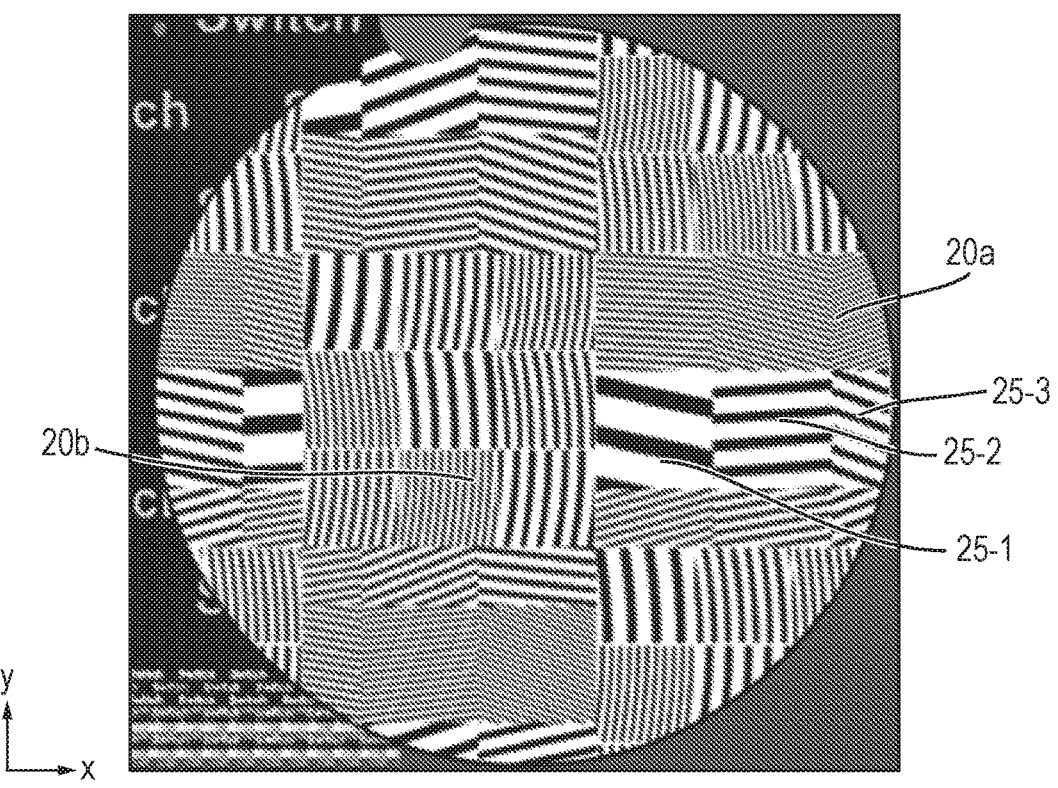
FIG. 10 is a magnified view of interlaced achromatic grating regions according to an embodiment of the invention.

FIG. 10 is a magnified view of a plurality of interlaced achromatic grating regions of a portion of a device that exhibits an invariant diffractive white background as the device is rotated within its plane by 90 degrees. The achromatic first grating regions 20a comprise grating sub-regions having grating elements that are orientated at different angles within the plane of the device, for example as shown with grating sub-regions 25-1, 25-2 and 25-3. The achromatic second grating regions 20b each comprise curved grating elements. It will be appreciated that the grating regions may comprise one or more of offset grating elements and curved grating elements. It is noted that each grating element of the first grating regions 20a has a principal component of orientation that is perpendicular to the principal component of orientation of each grating element of the second grating regions 20b, such that the variable optical effect is most clearly perceived as the device is rotated by 90 degrees within its plane.

Although the use of offset grating elements and curved grating elements outlined above have been described in relation to the achromatic regions, these techniques may also be used for "image regions" within the device, such that the image(s) may be perceived at a plurality of rotation angles of the device.

Optical devices of the sorts described above can be incorporated into or applied to any product for which an authenticity check is desirable; in which case they act as security devices. In particular, such devices may be applied to or incorporated into documents of value such as banknotes, passports, driving licenses, cheques, identification cards etc. The complete security device can either be formed directly on the security document or may be supplied as part of a security article, such as a security thread or patch, which can then be applied to or incorporated into such a document.

Such security articles can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP-A-0059056. EP-A-0860298 and WO-A-03095188 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

The security article may be incorporated into a paper or polymer base substrate so that it is viewable from both sides of the finished security substrate at at least one window of the document. Methods of incorporating security elements in such a manner are described in EP-A-1141480 and WO-A-03054297. In the method described in EP-A-

1141480, one side of the security element is wholly exposed at one surface of the substrate in which it is partially embedded, and partially exposed in windows at the other surface of the substrate.

Base substrates suitable for making security substrates for security documents may be formed from any conventional materials, including paper and polymer. Techniques are known in the art for forming substantially transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security device or a separate security device can be applied to the transparent substrate of the document. WO-A-0039391 describes a method of making a transparent region in a paper substrate. Other methods for forming transparent regions in paper substrates are described in EP-A-723501, EP-A-724519, WO-A-03054297 and EP-A-1398174.

The security device may also be applied to one side of a paper substrate, optionally so that portions are located in an aperture formed in the paper substrate. An example of a method of producing such an aperture can be found in WO-A-03054297. An alternative method of incorporating a security element which is visible in apertures in one side of a paper substrate and wholly exposed on the other side of the paper substrate can be found in WO-A-2000/39391.

Figure 11A:
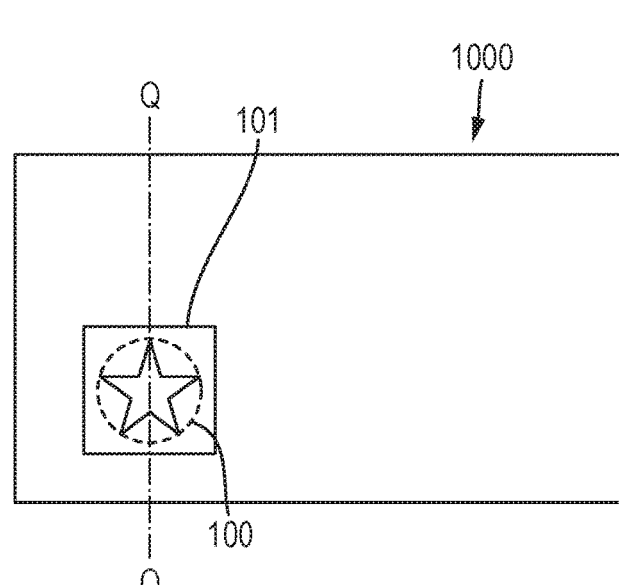
Figure 11B:
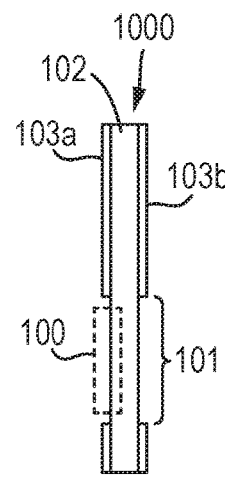
Figure 12A:
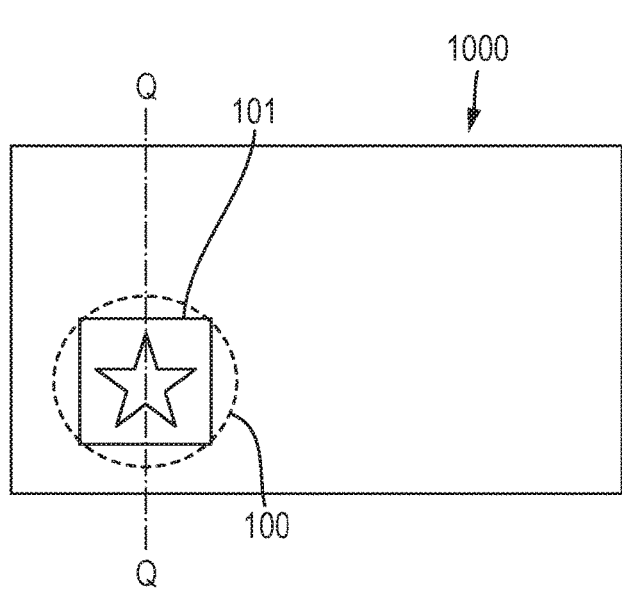
Figures 12B, 12C:
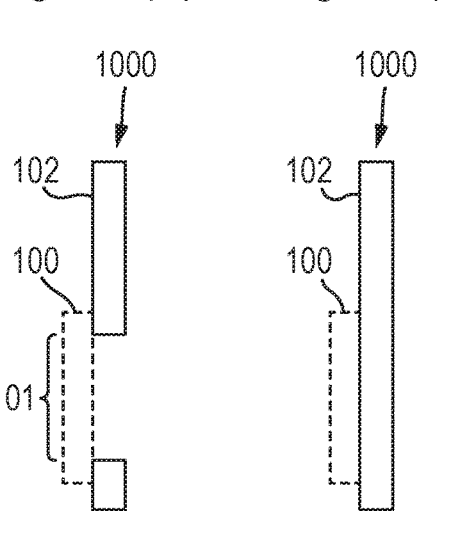

The device of the present invention is principally designed for viewing in reflection, in which case the diffractive structure will have a thin reflective metal or high refractive index coating applied to it. However, the device of the present invention may be designed to be viewed trans-mission. FIGS. 11, 12 and 13 depict examples of security documents in which security devices of the sorts described above have been incorporated. For clarity of description, the diffractive image exhibited by the security device in the following figures is illustrated by a star. FIG. 11 shows a first exemplary security document, here a banknote 1000, in (a) plan view and (b) cross-section along line Q-Q'. Here, the banknote 1000 is a polymer banknote, comprising an inter-nal transparent polymer substrate 102 which is coated on each side with opacifying layers 103*a* and 103*b* in a con-ventional manner. In some cases, the opacifying layers may be provided on one side of the substrate 102 only. The opacifying layers 103*a* and 103*b* are omitted in a region of the document so as to define a window 101, here having a square shape. Within the window region 101 is located a security device 100 in accordance with any of the embodi-ments discussed above. The security device 100 may be formed by applying a suitable resist material onto the substrate 102, in which the diffractive structure is formed. Alternatively, the security device 100 may have been formed separately on a security article such as a transfer patch or label. In this case, the security device 100 may be affixed to the transparent substrate 102 inside the window region 101 by means of a suitable adhesive. Application may be achieved by a hot or cold transfer method e.g. hot stamping.

It should be noted that a similar construction could be achieved using a paper/plastic composite banknote in which the opacifying layers 103*a* and 103*b* are replaced by paper layers laminated (with or without adhesive) to an internal transparent polymer layer 102. The paper layers may be omitted from the window region from the outset, or the paper could be removed locally after lamination. In other constructions, the order of the layers may be reversed with a (windowed) paper layer on the inside and transparent polymer layers on the outside.

FIG. 11 shows the use of a "full" window where the regions where the opacifying layers are omitted are in register. It will be appreciated that the device 100 may be applied in a "half window", for example in a case where opacifying layer 103*b* was present across window region 101.

In FIG. 12, the banknote 1000 is of conventional con-struction having a substrate 102 formed for example of paper or other relatively opaque or translucent material. The window region 101 is formed as an aperture through the substrate 102. The security device 100 is applied as a patch overlapping the edges of window 101 utilising an adhesive to join the patch security article to the document substrate 102. Again, the application of the security device and document could be achieved using various methods includ-ing hot stamping. FIG. 12(*c*) shows a variant in which the window 101 is omitted and the device 100 is simply applied to a section of the substrate 102 using any convenient application technique such as hot stamping. In such arrange-ments the device 100 will of course only be viewable from one side of the security document 100.

FIG. 13 depicts a third example of a security document, again a banknote 1000, to which a security article 105 in the form of a security thread or security strip has been applied. Three security devices 100 each carried on the strip 105 are revealed through windows 101, arranged in a line on the document 1000. Two alternative constructions of the docu-ment are shown in cross-section in FIGS. 13(*b*) and 13(*c*). FIG. 13(*b*) depicts the security thread or strip 105 incorpo-rated within the security document 1000, between two portions of the document substrate 102(*a*), 102(*b*). For example, the security thread or strip 105 may be incorpo-rated within the substrate's structure during the paper mak-ing process using well known techniques. To form the windows 101, the paper may be removed locally after completion of the paper making process, e.g. by abrasion. Alternatively, the paper making process could be designed so as to omit paper in the desired window regions. FIG. 13(*c*) shows an alternative arrangement in which the security thread or strip 105 carrying the security device 100 is applied to one side of document substrate 102, e.g. using adhesive. The windows 101 are formed by the provision of apertures in the substrate 102, which may exist prior to the application of strip 105 or be formed afterwards, again for example by abrasion.

Many alternative techniques for incorporating security documents of the sorts discussed above are known and could be used. For example, the above described device structures could be formed on other types of security document includ-ing identification cards, driving licenses, bankcards, pass-ports and other laminate structures, in which case the security device may be incorporated directly within the multilayer structure of the document.

The invention claimed is:

1. An optical device that exhibits a variable optical effect upon illumination, comprising:

a set of first grating regions, wherein each first grating region comprises a plurality of first grating elements, each first grating element having a principal component of orientation within the plane of the device that is substantially orthogonal to a first direction; and a set of second grating regions, wherein each second grating region comprises a plurality of second grating elements, each second grating element having a prin-cipal component of orientation within the plane of the device that is substantially orthogonal to a second direction different to the first direction; wherein at least a subset of the first grating regions each exhibit a diffractive color such that a user viewing the device at a viewing angle e along the first direction perceives a first diffractive color image, at least a subset of the second grating regions are achromatic grating regions, wherein each achromatic grating region comprises a plurality of grating sub-regions having different respective grating element pitches ranging from a coarse pitch to a fine pitch and arranged such that, for a plurality of viewing angles along the second direction, the diffractive colors exhibited by the plurality of grating sub-regions cooperate such that the achromatic grating region is perceived to exhibit diffractive whiteness, the set of first grating regions is interlaced with the set of second grating regions, and the plurality of grating sub-regions within each achromatic grating region comprises:

a fine grating sub-region having a fine grating element pitch of less than or equal to 0.7 microns, a coarse grating sub-region having a coarse grating element pitch of greater than or equal to 3 microns, and one or more intermediate grating sub-regions each having a grating element pitch that is between the coarse grating element pitch and the fine grating element pitch, and wherein the grating element pitches of the one or more intermediate grating sub-regions are different.

2. The device of claim 1, wherein each of the second grating regions are achromatic grating regions.

3. The device of claim 1, wherein the arrangement of grating sub-regions and their respective pitches within an achromatic grating region is such that:

a first group of grating sub-regions comprises grating sub-regions corresponding to a first set of color channels when viewed at a first viewing angle which cooperate such that the achromatic grating region exhibits diffractive whiteness at said first viewing angle; and a second group of grating sub-regions comprises grating sub-regions corresponding to a second set of color channels when viewed at a second viewing angle different to the first viewing angle which cooperate such that the achromatic grating region exhibits diffractive whiteness at said second viewing angle.

4. The device of claim 1, wherein each achromatic grating region comprises at least four intermediate grating sub-regions.

5. The device of claim 1, wherein the grating sub-regions within an achromatic grating region are arranged in a substantially contiguous manner.

6. The device of claim 1, wherein the grating elements of at least two grating sub-regions within an achromatic grating region have different orientations within the plane of the device.

7. The device of claim 1, wherein the first and second directions are offset by an angle greater than or equal to 45 degrees.

8. The device of claim 1, wherein a first subset of the first grating regions each exhibit a diffractive color and a second subset of the first grating regions are achromatic grating regions that are perceived to exhibit diffractive whiteness when viewed at a plurality of viewing angles along the first direction.

9. The device of claim 1, wherein a first subset of the second grating regions are achromatic grating regions and each of a second subset of the second grating regions exhibits a diffractive color such that a user viewing the device at a viewing angle along the second direction perceives a second diffractive color image.

10. The device of claim 9, wherein a first subset of the first grating regions each exhibit a diffractive color and a second subset of the first grating regions are achromatic grating regions that are perceived to exhibit diffractive whiteness when viewed at a plurality of viewing angles along the first direction, and wherein the positions of the achromatic grating regions of the first grating regions correspond to the positions of the achromatic grating regions of the second grating regions.

11. The device of claim 1, wherein the dimensions of each grating region are such that they are not discernible to the naked human eye.

12. The device of claim 1, wherein each grating region has a maximum dimension of 70 microns.

13. The device of claim 1, wherein each grating sub-region has a maximum dimension of 25 microns.

14. The device of claim 1, wherein the set of first grating regions is interlaced with the set of second grating regions in a grid pattern, such that the first grating regions are interlaced with the second grating regions along two directions.

15. The device of claim 1, wherein the first grating regions and the second grating regions are arranged in a substantially contiguous manner.

16. The device claim 1 further comprising a set of non-diffractive regions, wherein each non-diffractive region comprises an absence of grating elements.

17. The device of claim 1, wherein the optical device is a security device.

18. A security article or a security document comprising a security device according to claim 17.

19. A method of manufacturing an optical device that exhibits a variable optical effect upon illumination, the method comprising:

forming a diffractive structure in a carrier layer, the diffractive structure comprising:

a set of first grating regions, wherein each first grating region comprises a plurality of first grating elements, each first grating element having a principal component of orientation within the plane of the device that is substantially orthogonal to a first direction; and a set of second grating regions, wherein each second grating region comprises a plurality of second grating elements, each second grating element having a principal component of orientation within the plane of the device that is substantially orthogonal to a second direction different to the first direction, wherein at least a subset of the first grating regions each exhibit a diffractive color such that a user viewing the device at a viewing angle along the first direction perceives a first diffractive color image, at least a subset of the second grating regions are achromatic grating regions, wherein each achromatic grating region comprises a plurality of grating sub-regions having different respective grating element pitches ranging from a coarse pitch to a fine pitch and arranged such that, for a plurality of viewing angles along the second direction, the diffractive colors exhibited by the plurality of grating sub-regions cooperate such that the achromatic grating region is perceived to exhibit diffractive whiteness, the set of first grating regions is interlaced with the set of second grating regions, and the plurality of grating sub-regions within each achromatic grating region comprises:

a fine grating sub-region having a fine grating element pitch of less than or equal to 0.7 microns, a coarse grating sub-region having a coarse grating element pitch of greater than or equal to 3 microns, and one or more intermediate grating sub-regions each having a grating element pitch that is between the coarse grating element pitch and the fine grating element pitch, and wherein the grating element pitches of the one or more intermediate grating sub-regions are different.

* * * * *